C. W. GRAHAM.

CAN END AND GASKET ASSEMBLING MACHINE.

APPLICATION FILED APR. 25, 1918.

Reissued Aug. 19, 1919.

14,708.

5 SHEETS—SHEET 1.

Inventor
Charles W. Graham
By Munday, Clarke & Carpenter Attys.

C. W. GRAHAM.

CAN END AND GASKET ASSEMBLING MACHINE.

APPLICATION FILED APR. 25, 1918.

Reissued Aug. 19, 1919.

14,708.

5 SHEETS—SHEET 2.

Charles W. Graham

By Fryer, Day, Clarke & Carpenter Attys.

C. W. GRAHAM.

CAN END AND GASKET ASSEMBLING MACHINE.

APPLICATION FILED APR. 25, 1918.

Reissued Aug. 19, 1919.

14,708.

5 SHEETS—SHEET 3.

Charles W. Graham Inventor

By Munn, Day, Clarke & Carpenter Attys.

C. W. GRAHAM.

CAN END AND GASKET ASSEMBLING MACHINE.

APPLICATION FILED APR. 25, 1918.

Reissued Aug. 19, 1919.

14,708.

5 SHEETS—SHEET 4.

Inventor
Charles W. Graham
By Gregory, Clarke & Carpenter Attys.

C. W. GRAHAM.

CAN END AND GASKET ASSEMBLING MACHINE.

APPLICATION FILED APR. 25, 1918.

Reissued Aug. 19, 1919.

14,708.

5 SHEETS—SHEET 5.

Inventor
Charles W. Graham
By Munday, Clarke & Carpenter
Attys.

UNITED STATES PATENT OFFICE.

CHARLES W. GRAHAM, OF ALLENDALE, NEW JERSEY, ASSIGNOR TO AMERICAN CAN COMPANY, OF NEW YORK, N. Y., A CORPORATION OF NEW JERSEY.

CAN-END AND GASKET ASSEMBLING MACHINE.

14,708. Specification of Reissued Letters Patent. Reissued Aug. 19, 1919.

Original No. 1,154,245, dated September 21, 1915, Serial No. 736,900, filed December 16, 1912. Application for reissue filed April 25, 1918. Serial No. 230,805.

DIVISION A.

*To all whom it may concern:*

Be it known that I, CHARLES W. GRAHAM, a citizen of the United States, residing in Allendale, in the county of Bergen and State of New Jersey, have invented a new and useful Improvement in Can-End and Gasket Assembling Machines, of which the following is a specification.

This invention relates to an improved mechanism for applying gaskets or ring liners of paper or other fibrous material to the seaming flanges of can ends, such as are used in the manufacture of what are commonly termed sanitary or double seamed cans.

One object of the invention is to provide a mechanism of the type above indicated, which will cut an annular gasket from a web of paper or other fibrous material and apply or deposit the same on the flange of a can end in such a manner that the gasket is never dependent upon the force of gravity during the assembling operation.

Another object of the invention is to provide a mechanism which will perforate and cut an annular gasket from a web of gasket material at one stroke and during a single operation.

Another object of the invention is to provide a mechanism in which the elements used for perforating and cutting out the annular gasket also serve to positively position the gasket on the cam end flange.

A still further object of the invention is to provide a mechanism for applying gaskets to can ends, which comprises gangs of mechanisms so arranged that a plurality of gaskets and can ends are treated simultaneously.

I am aware that hitherto attempts have been made to provide machines which will cut annular gaskets from paper or other fibrous material and deposit the same on the seaming flange of can ends. But such machines, so far as I am aware, have proved more or less defective, in that means have not been provided for at all times keeping the light, flexible, cut gasket under positive control while assembling the same with the can end, the gasket at some time or other during the assembling operation generally being dependent upon the influence of gravity for its movements from one part of the mechanism to another.

In my improvements, I have provided means which overcome all the objections hitherto found in prior machines for applying paper gaskets to can ends, and in which the gasket is at all times positively and mechanically controlled and moved. Said means are fully disclosed in the drawings, and in said drawings, Figure 1 is a front elevation of a machine embodying my improvements, showing the gang punches in position to assemble the gaskets within the circumferential grooves of the can ends, the web feeding mechanism being omitted to more clearly show the other parts;

Figure 1:
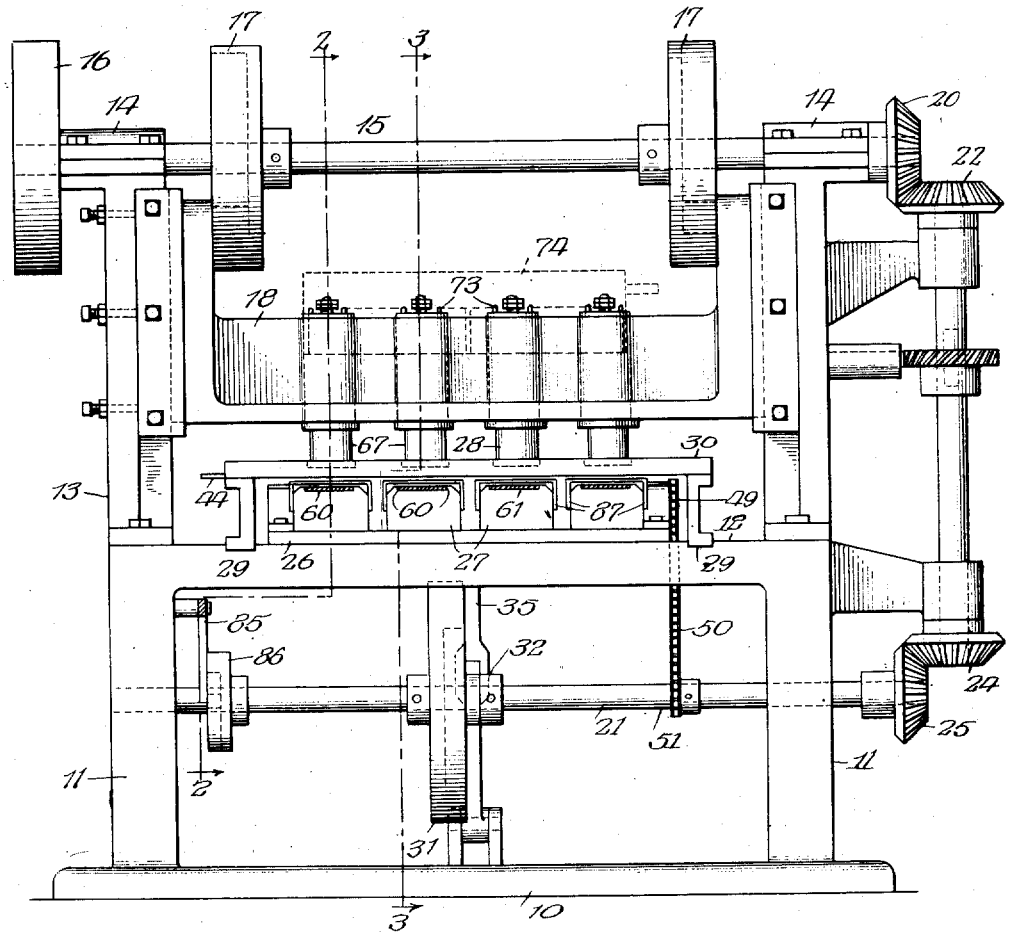
Figure 2:
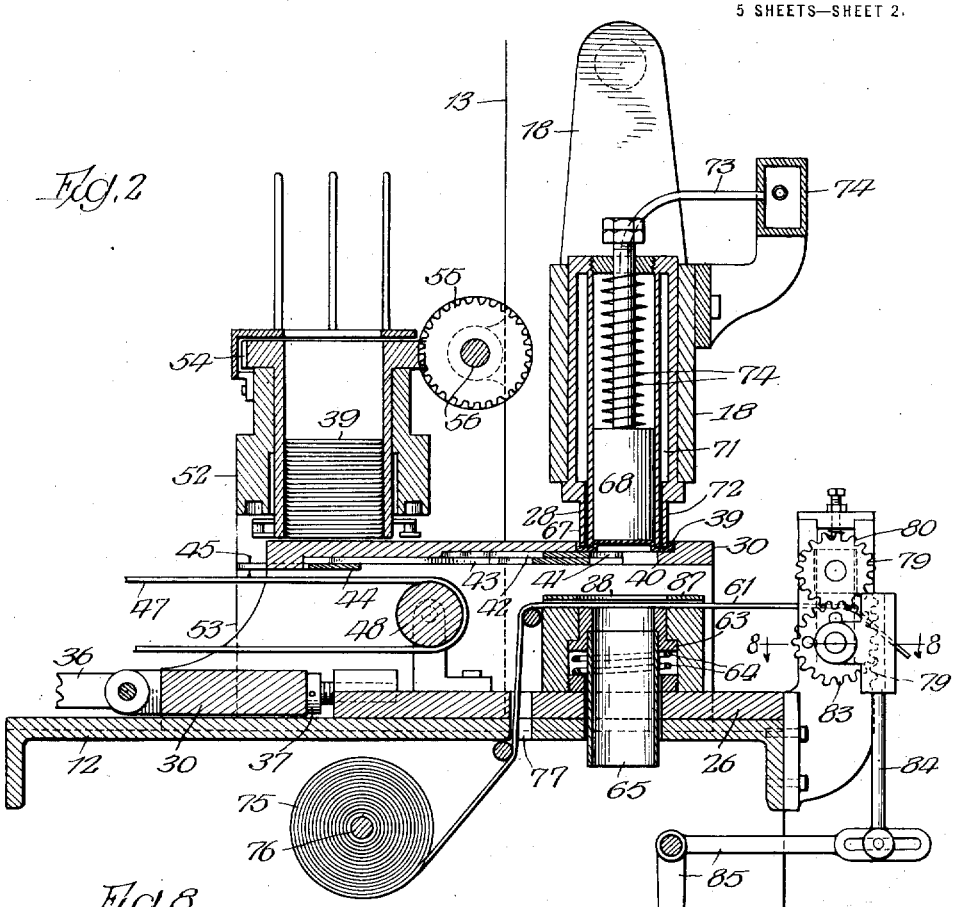
Fig. 2 is a partial vertical section, upon a somewhat larger scale than Fig. 1, and taken substantially on the line 2—2 thereof, the web feeding mechanism being shown in end elevation.
Figure 8:
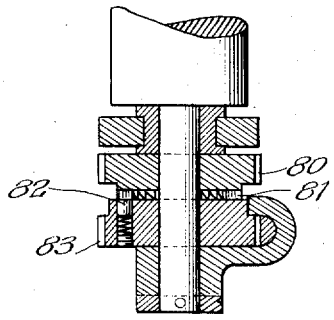
Figure 3:
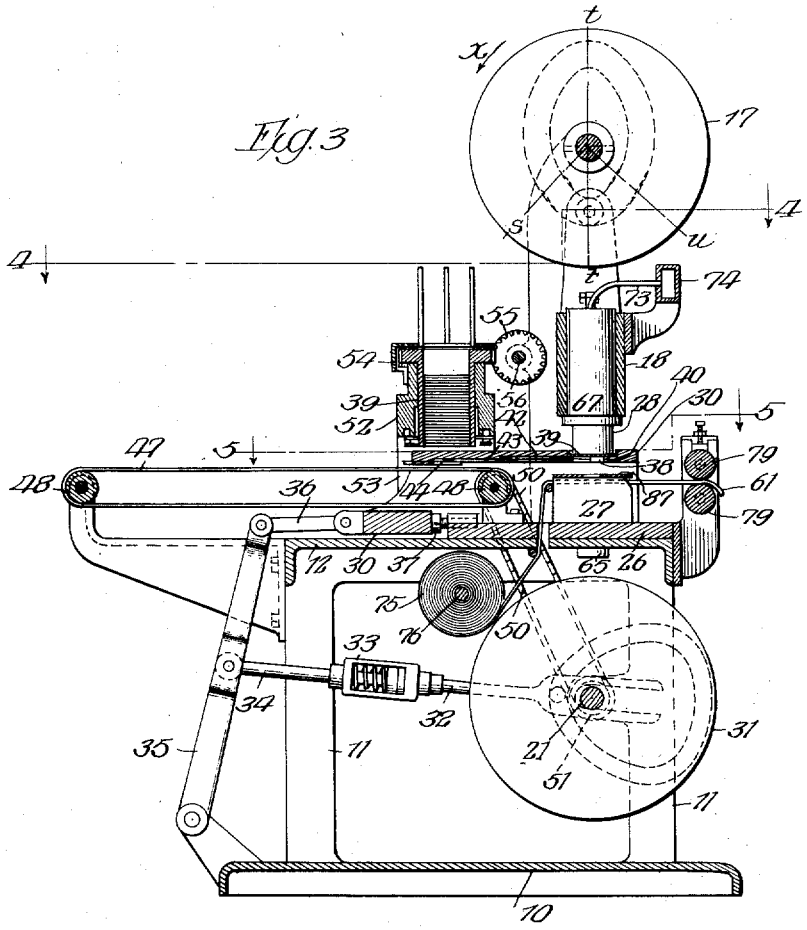
Fig. 3 is a transverse, vertical section, taken substantially on the line 3—3 of Fig. 1.
Figure 9:
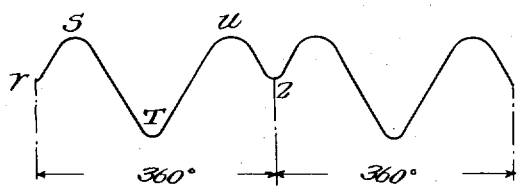
Figure 4:
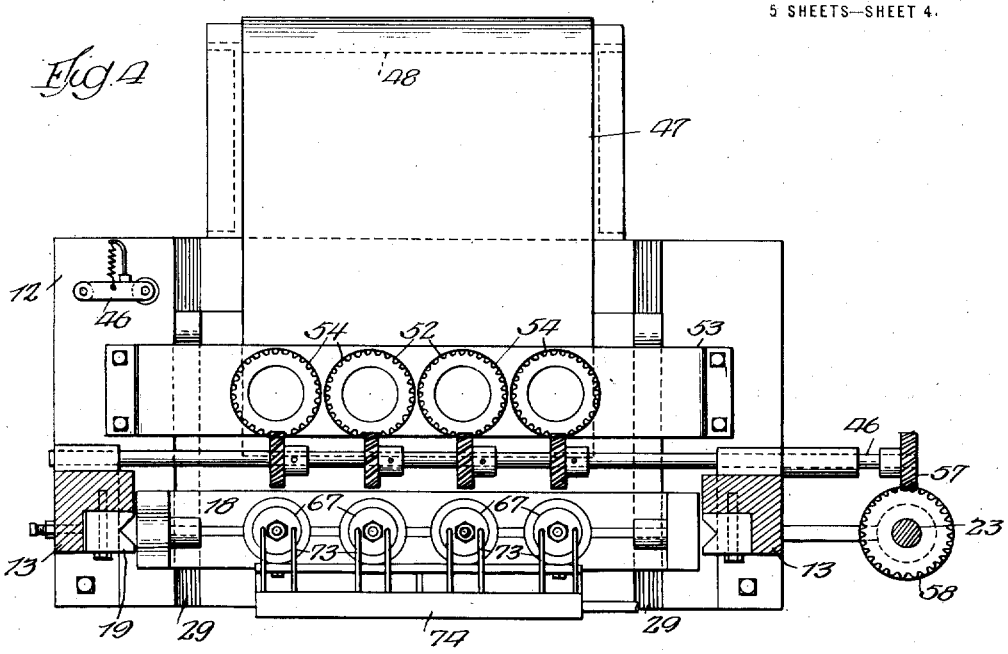
Figure 5:
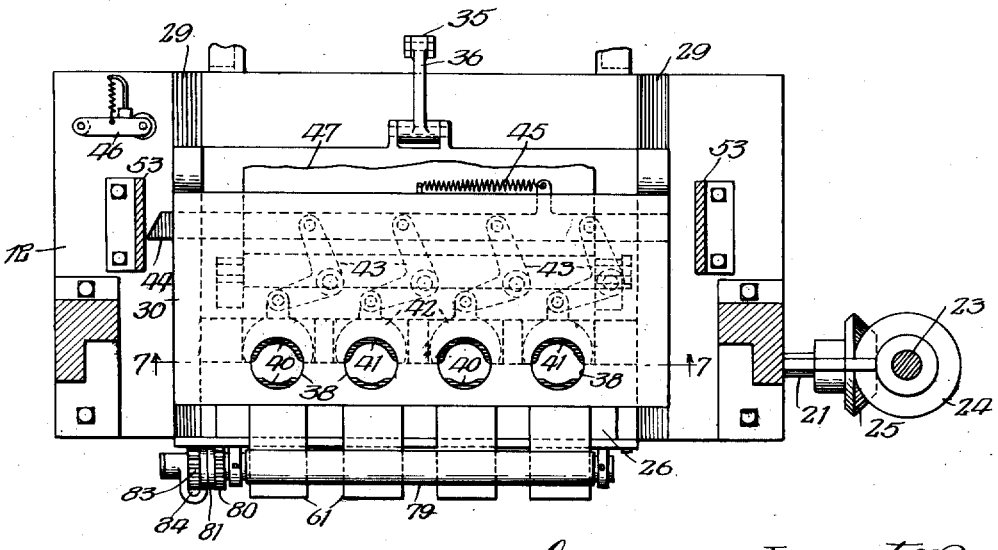
Figure 5:
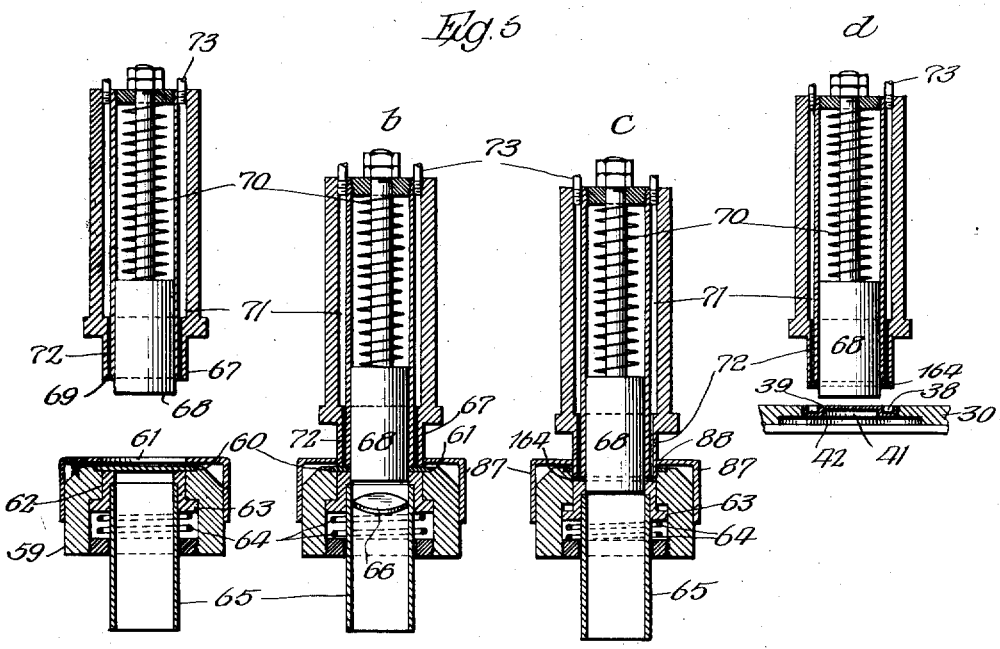
Figure 7:
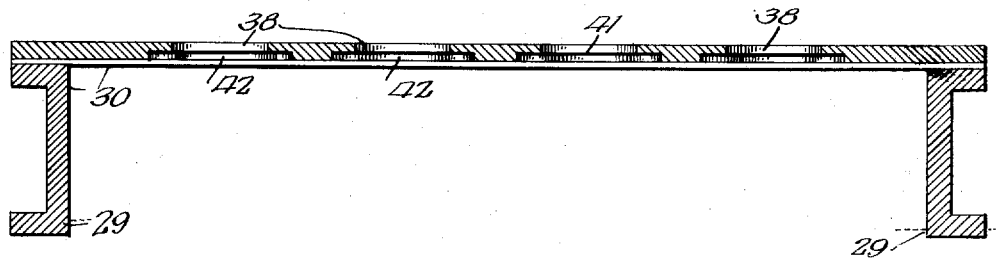

Figs. 4 and 5 are horizontal, sectional views, taken respectively on the lines 4—4 and 5—5 of Fig. 3, the web feeding mechanism being omitted in Fig. 4, and parts being broken away in Fig. 5, to more clearly disclose the construction;

Fig. 6 comprises a plurality of vertical, sectional views, of the compound punch and die mechanism which perforate, cut and assemble the gaskets on the can ends, said views representing four different relative positions of the punch and die;

Fig. 7 is a longitudinal, vertical, sectional view of the multiple can end carrier, detached, and taken substantially on the line 7—7 of Fig. 5;

Fig. 8 is a detail, sectional view, taken substantially on the line 8—8 of Fig. 2, illustrating a portion of the web feeding mechanism; and Fig. 9 is a diagrammatic view, illustrating two complete cycles of movements of the combined punches and cutters, as controlled by their operating cams.

In the drawings, the machine as shown comprises a base plate 10, having upright standards 11 and a horizontal bed 12. Extending upwardly from the bed 12 on opposite sides thereof are a pair of uprights 13, the same being provided at their upper ends with suitable journal boxes 14, in which is mounted a power shaft 15, driven from any suitable source (not shown) as by means of a pulley 16. Fixed on said shaft 15 are a pair of cams 17, more particularly hereinafter described, which are adapted to reciprocate a cross head 18, mounted in guides 19 secured on the uprights 13. Secured to the end of the shaft 15 is a bevel gear 20, which is adapted to operate a main driving shaft 21, extending longitudinally of the machine, through the intermediary of bevel gear 22, vertical shaft 23 and bevel gears 24 and 25. Mounted on the bed 12 is a bolster plate 26 which supports a plurality of compound dies 27, with which coöperate a corresponding number of compound punches 28 mounted in the cross head 18, the number of said compound dies and compound punches shown in the drawing being four, but it will be understood that more or less may be employed, if desired. Reciprocally mounted on the bed 12 in ways 29 is a multiple can end carrier 30, operated from a cam 31 on the shaft 21, through a forked rod 32, having a roller engaging in the groove of the cam 31, said rod 32 having a yieldable connection 33 with a second rod 34 pivotally connected to a lever arm 35, which in turn has pivoted thereto at its outer end a link 36, pivoted to the rear side of the carrier 30.

As more clearly shown in Fig. 2, the bolster plate 26 is provided with a threaded, adjustable stop 37 by which the carrier is brought to rest at the end of its forward stroke, to thereby properly position the can ends carried by it in alinement with the punches and dies, as hereinafter described, any excess movement of the carrier which would be imparted to it by the cam 31 being taken up by the yieldable connection 33. The carrier 30 is provided with a plurality of circular pockets 38, the number of said pockets corresponding to the number of the dies and punches, each pocket being of a diameter large enough to permit can ends 39 to pass therethrough, and each being provided with a stationary segmental ledge 40 and a retractable segmental ledge 41, formed on an arcuate member 42 pivotally connected to and operated by a bell crank 43, all of the bell cranks 43 being in turn pivotally connected to an operating bar 44, longitudinally slidable on the carrier and held in normal position by spring 45, but adapted to be operated by a spring-controlled, pivotally mounted trip 46 on the bed 12, as the carrier is retracted.

From the foregoing description, it will be seen that can ends which are fed to the pockets 38 will be held in position therein until the operating bar 44 engages the trip 46, whereupon all the can ends will be released simultaneously and allowed to drop onto an endless belt conveyer 47, mounted on suitably supported rollers 48 and adapted to be driven by means of a sprocket gear 49, secured to the end of one of the rollers, said sprocket gear 49 being driven by means of a sprocket chain 50, running over a sprocket gear 51, secured to the shaft 21. The cam 31 is so designed that the carrier 30 is given a dwell or period of rest at each end of its reciprocation, and while in its rearmost position, a plurality of can ends are adapted to be fed from stacks and dropped into the pockets 38 simultaneously, by means of a plurality of feeding mechanisms 52 mounted on a bridge 53, extending over the carrier 30, said feeding mechanisms 52 each including a spiral gear 54 operated by means of corresponding spiral gears 55, mounted on a longitudinally extending shaft 56, driven by means of a spiral gear 57 on the end thereof, and which meshes with a spiral gear 58 secured to the vertical shaft 23. A detailed description of the feeding mechanisms 52, which are all similar, is omitted, since the same are fully disclosed in my Patent No. 1,158,045, granted October 26, 1915.

By referring to Fig. 6, it will be seen that each compound die comprises a stationary outer member 59, having a guideway 60 therein on its upper face, for a web 61 of paper or other suitable fibrous, gasket forming material. Slidably mounted in a circular recess 62, formed in the member 59, is an annular female die 63, normally held in its uppermost position by a spring 64, the upper face of the die 63 being normally flush with the bottom of the guide 60, so that the web 61 lies flat thereon. Secured to the female die 63, and movable therewith, is a discharge tube 65, down which the circular disks 66, punched from the web of gasket material, are adapted to pass and be discharged from the machine.

Each punch 28, coöperating with a die 27, comprises an outer, annular cutting member 67, and a perforating punch 68 slidably mounted within the annular cutting member 67 and normally projected in advance of the cutting face 69 of the member 67 by means of a spring 70. The annular gasket or ring liner is cut from the web of gasket material 61 as follows: As the compound punch descends, the perforating member 68 thereof, being in advance, will first punch out a circular disk 66 from the web by passing into the annular female die 63, as shown in view *b* of Fig. 6, and as the descent of the compound punch continues, the face 69 of the annular cutting member 67 will engage the uncut portion of the web and press the female die 63 down with it against the action of the spring 64, thereby cutting an annular gasket 164 from the web, as shown in view *c*, Fig. 6. As the compound punch is started on its up-stroke, the female die 63 will move upwardly therewith, thus serving to positively retain the cut ring against the face 69 of the annular cutting member until the female die 63 reaches its uppermost normal position. Upon the continued upward movement of the compound punch, the ring liner will be carried thereby, since the same will be held by frictional contact to the outside of the perforating punch 68, as shown in view *d*, Fig. 6.

Although not essential to the successful operation of my mechanism, the annular cutting member 67 of each punch may be provided with a chamber 71, having a plurality of passageways 72 leading therefrom to the cutting face 69 and the chamber connected by means of short pipes 73 to a chamber 74 mounted on the cross head 18, said chamber 74 being common to all of the punches and being connected to a combined vacuum and blast pump (not shown), so regulated that a vacuum is created in the chambers of the punches during the upstroke, and an increased pressure or blast caused at the end of the short down stroke of the punch when the gasket is being assembled with the can end, as hereinafter described.

The webs of paper or other fibrous material are supplied from rolls 75, mounted on a transversely extending shaft 76, there being a separate roll of material for each set of punches and dies. The web passes through a slot 77 in the bed 12 and bolster plate 26, over a roller 78, along the guide 60, and is pulled or fed intermittently by the following arranged mechanism. The scrap of the web passes between two rollers 79, 79, longitudinally arranged on the front of the machine and common to all the webs being fed, said rolls being mounted in suitable journal boxes, one of which is preferably adjustably and yieldably mounted, as shown in Fig. 2. The ends of the shafts supporting the rollers 79 are provided with meshing gears 80, the lower one of which is provided with a ratchet face 81 (see Fig. 8) and rotated step by step by means of a spring pressed pawl 82 located in a gear 83 rotatably mounted on the extended shaft of the lower roller 79, and oscillated by means of a rack bar 84, which receives a reciprocating movement by means of a bell crank lever 85 from a cam 86 mounted on the operating shaft 21, the cam 86 being so timed that the webs of paper will be pulled through the dies while the punches are in elevated position. As shown in Fig. 6, each die is provided with a plate 87, provided with a suitable opening 88, through which is adapted to pass the compound punch, said plate preventing the lifting up of the scrap of the web of gasket material during the upstroke of the punch and serving as a stripper.

The operation of the machine during a complete cycle is as follows: Starting with the parts in the position as shown in Fig. 3, in which position the gasket is just being deposited in a can end 39, a continued rotation of the cams 17 in the direction indicated by the arrow *x* through the angle included between the radial lines *r* and *s* will lift the cross head 18, carrying the punches 28 therewith, a distance corresponding to that between the points R and S on the diagrammatic outline of the cam shown in Fig. 9. Immediately after the punches are started on this part of their short upstroke, the carrier 30 will be retracted, during which movement the assembled can ends and gaskets will be released, as hereinbefore described, and the carrier finally brought to a position where the can end pockets 38 are in alinement with the feeding devices 52, and the carrier will then have a period of rest long enough to permit of the deposition of the can ends in the pocket. As the cams 17 continue to rotate through the angle between the radial lines *s* and *t* (Fig. 3,) the cross head 18 will descend an amount corresponding to the distance indicated between the points S and T on the diagrammatic outline, Fig. 9. During this downstroke, the perforating and cutting operations will take place in the manner described in connection with the detailed description of the compound punches and compound dies. Upon the continued rotation of the cams 17 through the angle between the radial lines *t* and *u*, the cross head will be raised as indicated by the line between the points T and U, in Fig. 9, and during this upward movement, after the punches have been raised above the level of the top of the carrier 30, the latter will begin to move forward, carrying with it the can ends or closures which have been deposited in the pockets 38. During this upward movement of the cross head and punches, the paper web 61 will be fed through the dies 27 to thereby position a new portion of the web in position for another gasket to be cut therefrom. Upon the cams 17 continuing their rotation an amount corresponding to the angle between the radial lines *u* and *r*, the cross head with the punches will descend the length of the short stroke and the gaskets carried by the punches will be deposited in the can ends on the carrier, which will have been brought to rest prior to the punches reaching their lowermost point in the short down stroke. This movement of the cross head and punches is denoted in Fig. 9 by the line between the points U and R. As will be understood, the foregoing cycle of operations will be repeated for each complete rotation of the cams 17.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I do not claim herein the described process of lining can ends, the same being the subject of my application Serial No. 238,049, filed June 3, 1918, as a division hereof.

I claim:

1. In a machine for cutting and applying gaskets to container closures, means for cutting a gasket and assembling it on a closure, said means including a male and female die relatively axially movable, the male die carrying the gasket when cut and arranged to deposit it on a closure when one is placed between the male and female dies, in combination with means for feeding container closures successively, and at the intervals between the die-punching operations, into line between the said male and female dies, substantially as specified.

2. In a machine for cutting and applying gaskets to container closures, means for cutting a gasket and assembling it on a closure, said means including a male and female die relatively axially movable, the male die carrying the gasket when cut and arranged to deposit it on a closure when one is placed between the male and female dies, and means for feeding gasket material between the male and female dies, in combination with means for feeding container closures successively, and at the intervals between the die-punching operations, into line between the said male and female dies, substantially as specified.

3. A machine of the character described for cutting and applying gaskets to container closures comprising in combination: a gasket material feeder; coöperating gasket cutting members relatively movable toward and from each other, one of said members being adapted to carry a cut gasket with it; means for positioning a closure in alinement with said cutting members when the same are separated; and mechanism for operating said gasket carrying member so that it will deposit a gasket on the closure, substantially as specified.

4. In a mechanism for cutting and applying gaskets, in combination: a female die; a cutting male punch coöperating with the female die and adapted to cut an annular gasket from gasket material; means for feeding container closures successively, and at the intervals between the die-punching operations, into line between the said die and punch; and mechanism for causing the die-punching devices to have alternately a long punching stroke, and a shorter stroke for applying the gasket to the positioned container closure.

5. A machine of the character described for cutting and applying gaskets to container closures comprising, in combination: means for cutting an annular gasket from a strip of gasket material, said means including a compound punch and a die, the compound punch comprising a perforating member adapted to retain and carry with it an annular cut gasket, and an annular cutting member adapted to serve as a stripper to remove a gasket from the perforating member and deposit said gasket on a container closure; and mechanism for moving said punch and die relatively toward and from each other, substantially as specified.

6. A machine of the character described for cutting and applying gaskets to container closures comprising, in combination: coöperating gasket cutting members including an annular cutter; mechanism for moving the cutting members relatively toward and from each other; means for positioning a container closure between the cutting members when the same are separated; and means for temporarily retaining a cut gasket against the end face of said annular cutter when the cutting members are separated, substantially as specified.

7. A machine of the character described for cutting and applying gaskets to container closures comprising, in combination: coöperating gasket cutting members including an annular cutter; mechanism for moving the cutting members relatively toward and from each other; means for positioning a container closure between the cutting members when the same are separated; and means for temporarily retaining a cut gasket against the end face of said annular cutter when the cutting members are separated, said means including a vacuum air chamber, substantially as specified.

8. A machine of the character described for cutting and applying gaskets to container closures comprising, in combination: coöperating gasket cutting members including an annular cutter and a perforating punch movable within the annular cutter; mechanism for moving the cutting members relatively toward and from each other;

means for positioning a container closure between the cutting members when the same are separated; and mechanism for operating said cutting members, substantially as specified.

9. In a mechanism of the character described, in combination: means for cutting an annular gasket from gasket material, said means including a die and a compound punch; means for imparting to said punch a long and a short stroke; and mechanism for placing a container closure between the punch and die and in alinement therewith when the same are separated, substantially as specified.

10. A machine of the character described for cutting and applying gaskets to container closures comprising, in combination: a punch and die adapted to cut an annular gasket from gasket material; devices for feeding a web of gasket material between the punch and die; mechanism for positioning a container closure between the punch and die when the same are separated and in alinement therewith; and means for reciprocating the punch a long and a short stroke, whereby the punch is adapted to deposit a cut gasket on a container closure, substantially as specified.

11. A machine of the character described for cutting and applying gaskets to container closures comprising, in combination: means for cutting an annular gasket from a web of gasket material, said means including a compound die and a compound punch, the latter having a perforating member and an annular cutting member, the perforating member being adapted to retain thereon a cut gasket after the cutting operation; means for reciprocating the punch strokes of different lengths; a web feeding device; and mechanism for positioning a container closure between the punch and die when the same are separated and in alinement therewith, whereby the cover is adapted to receive and have deposited thereon a cut gasket on the short stroke of the punch, substantially as specified.

12. A machine of the character described for cutting and applying gaskets to container closures comprising, in combination: coöperating gasket cutting members including a member adapted to place a cut gasket on a container closure; devices for feeding a web of gasket material between said cutting members; a carrier adapted to position a container closure between said cutting members when the same are separated and in alinement therewith; and mechanism for operating said cutting members, substantially as specified.

13. A machine of the character described for cutting and applying gaskets to container closures comprising, in combination: coöperating gasket cutting members; devices for feeding a web of gasket material between said cutting members; mechanism for operating said cutting members; a carrier adapted to position a closure between said cutting members when the same are separated and in alinement therewith; and means for automatically feeding closures to said carrier, substantially as specified.

14. A machine of the character described for cutting and applying gaskets to container closures comprising, in combination: coöperating punch and die members adapted to cut an annular gasket from a web of gasket material; devices for feeding a web of gasket material between said punch and die; mechanism for reciprocating said punch a long and a short stroke; a carrier adapted to position a container closure in alinement with said punch when the same is separated from the die to thereby receive a gasket carried by the punch when the latter is given its short stroke; and means for feeding closures to said carrier, substantially as specified.

15. A machine of the character described for cutting and applying gaskets to container closures comprising, in combination: coöperating punch and die members adapted to cut an annular gasket from a web of gasket material; devices for feeding a web of gasket material between said punch and die; mechanism for reciprocating said punch a long and a short stroke; a carrier adapted to position a container closure in alinement with said punch when the same is separated from the die to thereby receive a gasket carried by the punch when the latter is given its short stroke; means for feeding closures to said carrier; and means for discharging a closure from said carrier after the gasket has been assembled with the closure, substantially as specified.

16. A machine of the character described for cutting and applying gaskets to container closures comprising, in combination: coöperating punch and die members adapted to cut an annular gasket from a web of gasket material; devices for feeding a web of gasket material between said punch and die; mechanism for reciprocating said punch a long and a short stroke; a carrier adapted to position a container closure in alinement with said punch when the same is separated from the die to thereby receive a gasket carried by the punch when the latter is given its short stroke; means for feeding closures to said carrier; means for discharging a closure from said carrier after the gasket has been assembled with the closure; and a conveyer adapted to receive the discharged closures, substantially as specified.

17. A machine of the character described for cutting and applying gaskets to container closures comprising, in combination: means adapted to cut an annular gasket from a web of gasket material; devices for feeding a web of gasket material to said means; a carrier adapted to position a closure in alinement with said cutting means and between the same; and mechanism for operating said carrier and stopping the same at a predetermined point, including two members having a yieldable connection therebetween, substantially as specified.

18. A machine of the character described for cutting and applying gaskets to container closures comprising, in combination: coöperating gasket cutting members relatively movable toward and from each other, one of said members being adapted to place a cut gasket on a closure in alinement therewith; devices for feeding a web of gasket material between said members a carrier adapted to position a closure between said cutting members when the same are separated and in alinement therewith; an adjustable stop against which the carrier abuts at the end of one of its movements: and mechanism for reciprocating said carrier including two members having a yieldable connection therebetween, substantially as specified.

19. A machine of the character described for cutting and applying gaskets to container closures comprising, in combination: means for cutting an annular gasket from a web of gasket material including coöperating compound punch and die members, the punch being adapted to retain and carry with it, after the cutting operation, a cut gasket; devices for feeding a web of gasket material between the punch and die; a carrier adapted to position a container closure in alinement with said punch when the punch and die are separated; and mechanism for reciprocating said punch a long and a short stroke, the cutting operation being performed during the long stroke and a cut gasket being deposited on a closure during the short stroke, substantially as specified.

20. A machine of the character described for cutting and applying gaskets to container closures comprising, in combination: means for cutting an annular gasket from a web of gasket material, said means including coöperating punch and die members, the punch being adapted to carry a cut gasket with it when moved away from the die; devices for feeding a web of gasket material between the punch and die; a reciprocating carrier having a pocket therein adapted to receive a container closure; mechanism for reciprocating said punch a long and a short stroke and means for reciprocating said carrier to a position where said pocket is in alinement with the punch and allowing the carrier to have a period of rest in this position, whereby a gasket is deposited on the closure during the short stroke of the punch, substantially as specified.

21. A machine of the character described for cutting and applying gaskets to container closures comprising, in combination; means for cutting an annular gasket from a web of gasket material, said means including coöperating punch and die members, the punch being adapted to carry a cut gasket with it when moved away from the die; devices for feeding a web of gasket material between the punch and die; a reciprocating carrier having a pocket therein adapted to receive a container closure; mechanism for reciprocating said punch a long and a short stroke; means for reciprocating said carrier to a position where said pocket is in alinement with the punch and allowing the carrier to have a period of rest in this position, whereby a gasket is deposited on the closure during the short stroke of the punch and means, automatically operable, for feeding a closure to the pocket in said carrier, substantially as specified.

22. A machine of the character described for cutting and applying gaskets to container closures comprising, in combination: means for cutting an annular gasket from a web of gasket material including coöperating compound punch and die members, the punch being adapted to retain and carry with it, after the cutting operation, a cut gasket: devices for feeding a web of gasket material between the punch and die; a carrier adapted to position a container closure in alinement with said punch when the punch and die are separated; mechanism for reciprocating said punch a long and a short stroke, the cutting operation being performed during the long stroke and a cut gasket being deposited on a closure during the short stroke; and means for discharging a closure from said carrier after the gasket has been assembled with the closure, substantially as specified.

23. A machine of the character described for cutting and applying gaskets to container closures comprising, in combination: means for cutting an annular gasket from a web of gasket material including coöperating compound punch and die members, the punch being adapted to retain and carry with it, after the cutting operation, a cut gasket; devices for feeding a web of gasket material between the punch and die; a carrier adapted to position a container closure in alinement with said punch when the punch and die are separated; mechanism for reciprocating said punch a long and a short stroke, the cutting operation being performed during the long stroke and a cut gasket being deposited on a closure during the short stroke, and mechanism for reciprocating said carrier, including two members having a yieldable connection therebetween, substantially as specified.

24. In a machine for cutting and applying gaskets, in combination a plurality of simultaneously operating gasket cutting members; means for feeding a plurality of container closures simultaneously, and at the intervals between the successive cutting operations of said members, to positions in line with said members and above the plane of the cutting operation; some of said cutting members operating to assemble the cut gaskets with the fed container closures.

25. A machine of the character described for cutting and applying gaskets to container closures comprising, in combination: a plurality of sets of coöperating punches and dies adapted to cut annular gaskets from gasket material; a carrier member; mechanism for depositing a plurality of container closures simultaneously on said carrier member; mechanism for reciprocating said carrier member to thereby position closures carried by it in alinement with the punches; and means for operating the punches to deposit gaskets on the closures, substantially as specified.

26. A machine of the character described for cutting and applying gaskets to container closures comprising, in combination: a plurality of sets of coöperating punches and dies adapted to cut annular gaskets from gasket material; a carrier member; mechanism for depositing a plurality of container closures simultaneously on said carrier member; mechanism for reciprocating said carrier member to thereby position closures carried by it in alinement with the punches; means for operating the punches to deposit gaskets on the closures; and means for discharging the assembled closures and gaskets from said carrier member, substantially as specified.

27. A machine of the character described for cutting and applying gaskets to container closures comprising, in combination: means for cutting an annular gasket from a web of gasket material, said means comprising a compound punch and a compound die, the punch being adapted to retain and carry with it when separated from the die, a cut gasket; devices for feeding a web of gasket material between the punch and die; a reciprocating carrier provided with a pocket adapted to receive a container closure; mechanim for reciprocating said carrier to a position where said pocket is in alinement with the punch and allowing the carrier to have a period of rest in said position; means for automatically feeding a closure to said pocket in the carrier; and mechanism for reciprocating said punch a long stroke to thereby cut the gasket and a short stroke to thereby position the cut gasket, retained by the punch, on a closure when in alinement therewith, substantially as specified.

28. In a machine for cutting and applying gaskets, in combination: coöperating die and punch members having means for cutting ring gaskets from material placed between said members; devices for feeding and holding a container closure to and at a position between the said members; and mechanism connected with the punch member for giving the same successively a forward punching movement, a retractile movement to carry the gasket with the punch, and a forward feeding movement to feed and deposit the cut gasket.

29. In a machine for cutting and applying gaskets, in combination: coöperating punch and die members having means for perforating gasket material placed between said members and for then cutting a gasket therefrom; devices for feeding and holding a container closure to and at a position between the said members; and mechanism connected with the punch member for moving the same with the cut gasket thereon away from the die member and then with a feeding stroke shorter than a cutting stroke to deposit and apply the cut gasket.

CHARLES W. GRAHAM.